United States Patent
Riblet et al.

(10) Patent No.: US 11,402,126 B1
(45) Date of Patent: *Aug. 2, 2022

(54) AUTOMATED WATER HEATER FLUSHING AND MONITORING SYSTEM

(71) Applicant: State Farm Mutual Automobile Insurance Company, Bloomington, IL (US)

(72) Inventors: Jeffrey A. Riblet, Bloomington, IL (US); Melinda T. Magerkurth, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/070,610

(22) Filed: Oct. 14, 2020

Related U.S. Application Data

(63) Continuation of application No. 16/653,444, filed on Oct. 15, 2019, now Pat. No. 10,823,458, which is a
(Continued)

(51) Int. Cl.
*B23K 13/08* (2006.01)
*F24H 9/20* (2022.01)
(Continued)

(52) U.S. Cl.
CPC ........... *F24H 9/2014* (2013.01); *G05B 15/02* (2013.01); *G05D 7/06* (2013.01)

(58) Field of Classification Search
CPC ........ F24H 9/2014; F24H 9/16; F24H 9/2021; G05B 15/02; G05D 7/06; F24D 19/082;
(Continued)

(56) References Cited

U.S. PATENT DOCUMENTS 4,196,341 A 4/1980 Williams
4,714,053 A 12/1987 Perry
(Continued)

FOREIGN PATENT DOCUMENTS

WO 2006042053 A2 11/2007

OTHER PUBLICATIONS

Allan Budris, Power Precautions Analyzing pump startup and shutdown best practices, Aug. 3, 2013, https://www.waterworld.com/articles/print/volume29/issue-8/departments/p- ump-tips-techniques/power-precautions.html.
(Continued)

*Primary Examiner* — Cuong B Nguyen
(74) *Attorney, Agent, or Firm* — Armstrong Teasdale LLP

(57) ABSTRACT

An automatically flushing water heater maintenance system may be provided, the system including a water heater and a water heater controller. The water heater may include an inlet, an outlet, and a flush outlet having a first control valve in flow communication therewith. The first control valve may be configured to control a flow of water and sediment through the flush outlet out of the water heater. The water heater controller may be configured to communicate with the first control valve by transmitting a first control signal to the first control valve, the first control signal configured to cause the first control valve to open or close as part of an automatic flushing process. As a result of the flushing, the useful life of the water heater may be extended, and/or water heater leakage alleviated. Insurance discounts may be provided based upon using the automatic water heater flushing functionality.

18 Claims, 5 Drawing Sheets

Related U.S. Application Data continuation of application No. 16/016,850, filed on Jun. 25, 2018, now Pat. No. 10,480,825, which is a continuation of application No. 15/056,633, filed on Feb. 29, 2016, now Pat. No. 10,047,974.

(60) Provisional application No. 62/252,265, filed on Nov. 6, 2015.

(51) Int. Cl.
*G05D 7/06* (2006.01)
*G05B 15/02* (2006.01)

(58) Field of Classification Search
CPC ... F17D 5/02; Y10T 137/135; Y10T 137/1353
See application file for complete search history.

(56) References Cited

U.S. PATENT DOCUMENTS

| | | | |
|---|---|---|---|
| 4,813,383 A | 3/1989 | Daugirda | |
| 4,858,563 A | 8/1989 | Perry | |
| 5,494,527 A | 2/1996 | Ludwig et al. | |
| 5,609,124 A | 3/1997 | Leclerc | |
| 5,921,207 A | 7/1999 | DiSalvo et al. | |
| 6,073,591 A | 6/2000 | Theriault | |
| 6,236,321 B1 | 5/2001 | Troost, IV | |
| 6,467,537 B1 | 10/2002 | Bujak, Jr. | |
| 6,508,208 B1 | 1/2003 | Frasure et al. | |
| 6,910,649 B2 | 6/2005 | Patterson | |
| 7,100,541 B2 | 9/2006 | Erasure et al. | |
| 7,234,389 B1 | 6/2007 | Lassota | |
| 8,910,649 B2 | 12/2014 | Singh | |
| 9,228,575 B2 | 1/2016 | Oberkorn et al. | |
| 10,047,974 B1 | 8/2018 | Riblet et al. | |
| 10,480,825 B1 * | 11/2019 | Riblet | F24H 9/2014 |
| 2001/0022416 A1 | 9/2001 | Harada et al. | |
| 2004/0206405 A1 | 10/2004 | Smith et al. | |
| 2005/0041962 A1 | 2/2005 | Moulder | |
| 2006/0011553 A1 | 1/2006 | Nightingale | |
| 2007/0062464 A1 | 3/2007 | Frasure et al. | |
| 2007/0295286 A1 | 12/2007 | Donnelly et al. | |
| 2009/0000573 A1 | 1/2009 | McClellan | |
| 2010/0133258 A1 * | 6/2010 | Fima | F24H 9/16 219/482 |
| 2011/0022416 A1 | 1/2011 | Bergquist et al. | |
| 2012/0291868 A1 | 11/2012 | Giladi | |
| 2014/0182624 A1 | 7/2014 | Taylor et al. | |
| 2014/0218006 A1 | 8/2014 | Gross et al. | |
| 2014/0321838 A1 | 10/2014 | Farris et al. | |
| 2015/0068625 A1 | 3/2015 | Singh | |
| 2016/0258635 A1 | 9/2016 | Zemach et al. | |

OTHER PUBLICATIONS

Vijeo, Vijeo Citect overview, May 2009, http://www2.schneider-electric.com/documents/solutions/domains/Vijeo_Citect_overview.pdf.

* cited by examiner

AUTOMATED WATER HEATER FLUSHING AND MONITORING SYSTEM

CROSS-REFERENCE TO RELATED APPLICATIONS

This application is continuation of and claims priority to U.S. patent application Ser. No. 16/653,444, entitled "Automated Water Heater Flushing and Monitoring System" filed Oct. 15, 2019, which is a continuation of and claims priority to U.S. patent application Ser. No. 16/016,850 (now U.S. Pat. No. 10,480,825), entitled "Automated Water Heater Flushing and Monitoring System" filed Jun. 25, 2018, which is a continuation of and claims priority to U.S. patent application Ser. No. 15/056,633 (now U.S. Pat. No. 10,047,974), entitled "Automated Water Heater Flushing and Monitoring System" filed Feb. 29, 2016, which claims the benefit of priority of U.S. Provisional Patent Application Ser. No. 62/252,265, filed Nov. 6, 2015, the contents of which are hereby incorporated by reference herein in their entireties and for all purposes.

FIELD OF THE INVENTION

The present disclosure relates to maintaining water heaters and, more particularly, to systems and methods for automatically flushing a water heater for maintaining the water heater and for reducing the risk of leaks.

BACKGROUND

Commercial and residential water heaters receive room temperature (e.g., cold) water that is then heated by the water heaters and distributed as heated (e.g., hot) water through the commercial or residential location. The water fed to the water heaters typically includes sediment. Some of the sediment may remain in the water heater tank after the water is heated and distributed. The sediment that remains may build up on the bottom of the water heater tank. Over time, this buildup of sediment may cause heat transfer within the water heater tank to slow, which in turn may cause overheating near the bottom of the tank. When the bottom of the tank is overheated, the metal bottom of the tank may weaken and the lining of the tank may be damaged. The weakening of the tank bottom and the damage to the tank lining may eventually cause the bottom of the tank to "fall out." Of course, if such an event occurs, the water stored within the tank and the inlet water entering the tank from the feed line may escape from the tank and may likely result in the flooding of the structure housing the water heater (e.g., a house or building).

In less extreme cases, the sediment buildup may cause smaller leaks in the water heater. These leaks, although smaller, may still cause flooding to a large portion of the structure housing the water heater. In order to reduce the likelihood of sediment buildup in a water heater, many manufacturers recommend that water heaters be flushed periodically so that sediment is removed from the water heater tank. Unfortunately, most owners do not follow those recommendations; as such, water heaters are not flushed on a regular basis. Accordingly, a system is needed to automatically flush water heaters on a regular basis and to monitor water heaters for leaks.

BRIEF SUMMARY

The present embodiments may relate to systems and methods for maintaining water heaters and, more specifically, for automatically flushing the water heater to prevent the water heater from failing, which may result in flooding and/or other leakage. The water heater maintenance system described herein maintains a tank of the water heater using automated flushing to prevent and/or remove a buildup of sediment in the bottom of the water heater tank. Such a buildup of sediment may lead to breaks in the tank. These breaks may lead to leaking or, in more extreme cases, failure of the tank, which may result in the flooding of the structure housing the water heater. Routine flushing of the water heater tank may aid in preventing buildup of sediment by removing sediment from the water heater tank. A duration of flushing may be determined by measuring an amount of time from start to finish of the flushing and/or by measuring an amount of water removed from the water heater tank. An interval between flushings may be determined according to manufacturer standards and/or user scheduling requests.

In addition, the water heater maintenance system described herein may include one or more controller devices ("water heater controller") in communication with a monitoring computing device and/or a third-party computing device (e.g., a computing device associated with an insurance provider). The water heater controller may transmit signals to, and/or receive signals from, such as via wired or wireless communication and data transmission, the monitoring computing device and/or the third-party computing device to request permission to initiate flushing, transmit status reports, and/or maintain a flushing history of the water heater.

In one aspect, an automatic flushing water heater maintenance system for maintaining water heaters may be provided. The system may include a water heater and a water heater controller. The water heater may include an inlet, an outlet, and a flush outlet having a first control valve in flow communication therewith. The first control valve may be configured to control a flow of water and sediment through the flush outlet out of the water heater. The water heater controller may be configured to communicate with the first control valve by transmitting a first control signal to the first control valve, the first control signal being configured to cause the first control valve to open or close as part of an automatic flushing process. As a result of the flushing process, a water heater's life may be extended, and/or home damage resulting water heater failure may be mitigated or prevented (and corresponding insurance claims reduced or eliminated).

In another aspect, a computer-implemented method for maintaining a water heater may be provided. The water heater may include an inlet, an outlet, and a flush outlet having a first control valve in flow communication therewith. The first control valve may be configured to control a flow of water and sediment through the flush outlet out of the water heater. The method may be implemented using a water heater controller including a processor in communication with a memory, the water heater controller being configured to communicate with the first control valve. The method may include determining, using the processor, that an automatic flushing process is to occur, and initiating the automatic flushing process. The method may also include transmitting a first control signal to the first control valve, the first control signal configured to cause the first control valve to open as part of the automatic flushing process to allow the flow of water and sediment through the flush outlet out of the water heater. The method may further include determining that the automatic flushing process is complete, and transmitting a second control signal to the first control valve, the second control signal being configured to cause the first control valve to close. As a result, flushing of the water heater may be facilitated, potentially extending its useful life and alleviating home damage caused by water heater failure.

In yet another aspect, at least one non-transitory computer-readable storage media having computer-executable instructions embodied thereon may be provided. When executed by a water heater controller, the computer-executable instructions may cause the processor to determine that an automatic flushing process is to occur, and initiate the automatic flushing process. The computer-executable instructions may also cause the processor to transmit a first control signal to a first control valve in flow communication with a flush outlet of a water heater, the first control signal being configured to cause the first control valve to open as part of the automatic flushing process to allow a flow of water and sediment through the flush outlet out of the water heater. The computer-executable instructions may further cause the processor to determine that the automatic flushing process is complete, and transmit a second control signal to the first control valve, the second control signal being configured to cause the first control valve to close. As a result of the flushing process, a water heater's useful life may be extended, and home damage resulting from water heater failure may potentially be alleviated.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
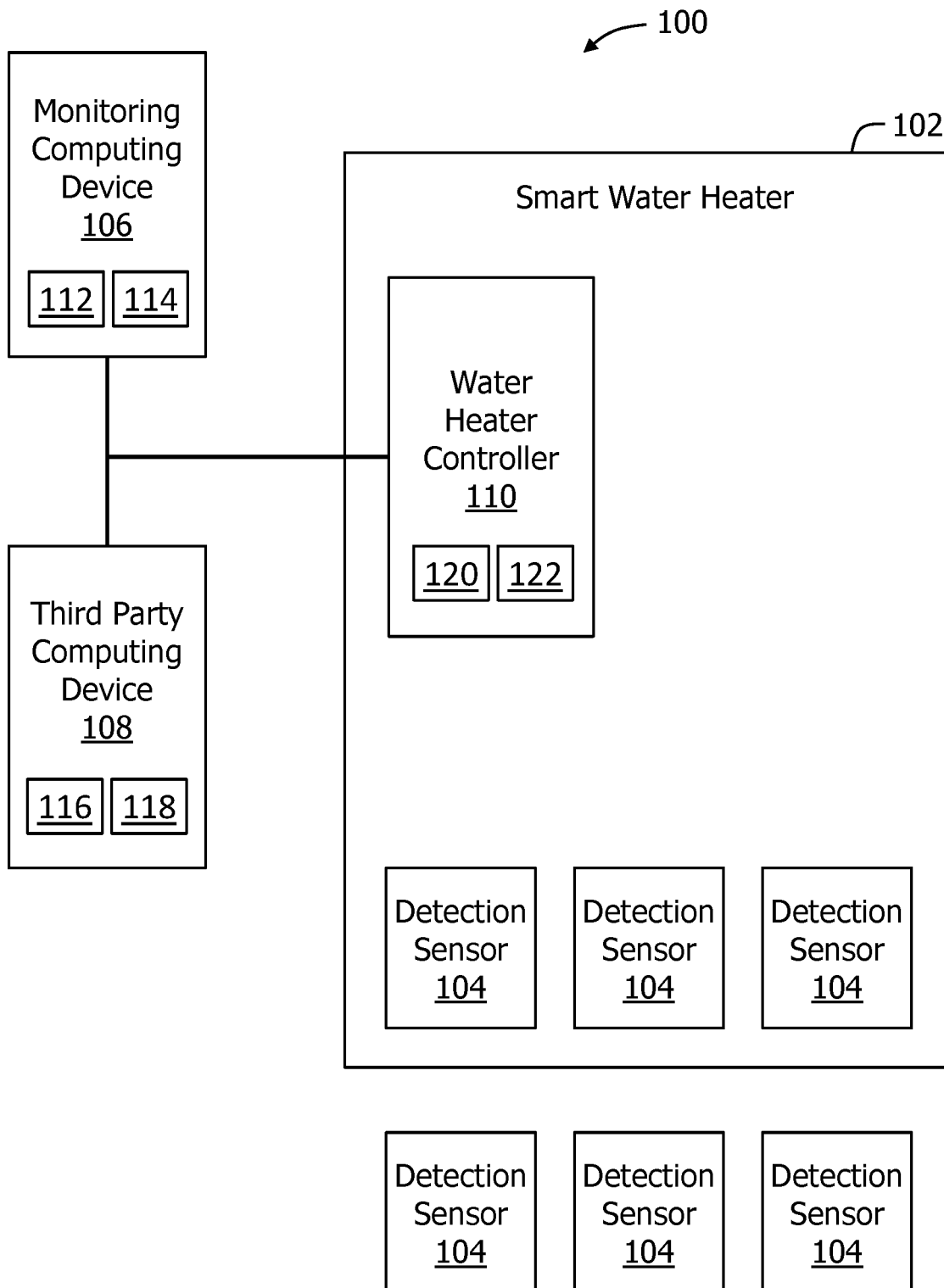
FIG. 1 is a schematic diagram illustrating an exemplary automatic flushing water heater maintenance system.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for maintaining a water heater, and more specifically, for automatically flushing a water heater to remove sediment from a water heater tank and monitoring the water heater for leaks to reduce the likelihood of flooding within a structure housing the water heater. The "water heater maintenance system" described herein may also be referred to herein as an "automatic flushing water heater maintenance system." This water heater maintenance system may be configured to automatically flush a smart water heater routinely by setting a date and time for the water heater to be automatically flushed and/or by setting an interval of time (e.g., every three months) after which the water heater is automatically flushed.

Automatic flush initiation of a smart water heater tank using the water heater maintenance system described herein may be accomplished using a variety of techniques, including factory programming, user request, and/or water heater maintenance system-suggested flushing. In some embodiments, the smart water heater may have factory settings. One such factory setting may include automated routine flushing. For example, the factory setting may initiate automatic flushing once or twice a year, once a quarter of a year, once a month, and/or when at least one detection sensor, as described herein, detects a particular threshold of change that is deemed unacceptable. In one example, the smart water heater may be pre-programmed to automatically flush the smart water heater tank every six months and/or at any other interval deemed by the manufacture of the smart water heater to provide the most efficient and well-maintained smart water heater.

In some embodiments, the smart water heater maintenance system described herein may include a setting for the smart water heater wherein a user (e.g., an owner of the structure housing the water heater, a maintainer of the structure housing the water heater, and/or an employee of a third party such as an insurance provider) may request an automated flushing of the smart water heater tank, for example, using a computing device, such as a mobile device (e.g., smart phone). The request from the user may indicate a desired flushing immediately or at a particular date and/or time in the future. For example, the user may request an automated flushing to occur in three weeks. The user may desire to have the flushing occur in three weeks rather than immediately because he will be out of town and would prefer for the flushing to occur when he is not home.

In other embodiments, the water heater maintenance system may include a setting wherein a flushing is deemed appropriate based on the reading(s) of at least one detection sensor. The at least one detection sensor may be attached to the smart water heater tank and/or located proximate to the smart water heater tank. The at least one detection sensor may be used to detect when sediment buildup has reached a point at which flushing may aid in preventing breakage of the smart water heater tank. Once the at least one detection sensor has determined a flushing would be appropriate, the at least one detection sensor may transmit a signal requesting a flushing of the smart water heater system by a water heater controller and/or the user. In embodiments in which the water heater maintenance system is programmed to allow the at least one detection sensor to request a flushing of the smart water heater tank without permission from the user, the at least one detection sensor may transmit a signal including a request for flushing when a change warranting a flushing is detected. In embodiments in which the at least one detection sensor is programmed to transmit a notification to the user (e.g., to a computing device associated with the user) stating that the water heater tank may benefit from a flushing, the detection sensor may transmit such a notification to the user requesting approval of the smart water heater tank flushing. The user may then approve the request or send his own request to flush the smart water heater tank, for example, using a computing device.

The water heater maintenance system described herein may include (1) a smart water heater, (2) a monitoring computing device, (3) at least one detection sensor, and/or (4) a third party computing device. The smart water heater may include (1) a tank having a bottom, a top, and a body (e.g., typically cylindrical in shape), (2) an inlet (e.g., for cold water), (3) an outlet (e.g., for hot water), (4) a flush outlet, (5) at least a first control valve (e.g., a solenoid valve) attached to the flush outlet, (6) a heating element, and/or (7) a water heater controller for controlling the smart water heater. The water heater controller may include a receiver for receiving signals wirelessly or otherwise, and/or a transmitter for transmitting signals.

The at least one detection sensor may include one or more sensors configured to detect a change in moisture, pressure, temperature, corrosion, weight, and/or sound. The detection sensors may be one of the listed detection sensors and/or a variety of the listed detection sensors. The at least one detection sensor may be configured to detect issues associated with the smart water heater, including detecting if there is a leak, a break in the tank, or flooding within the housing structure. Upon detection of an issue, the detection sensor(s) may transmit a signal identifying the issue(s) to the water heater controller. The water heater controller may be configured to initiate a flushing of the water heater upon detection of one or more issue(s) therewith (e.g., a leak or overheating). Additionally or alternatively, the water heater controller may be configured to alert a user (e.g., a homeowner, building owner, or third party employee) of any signals transmitted by the detection sensor(s) that indicate an issue with the water heater and/or with the flushing of the water heater. Additionally or alternatively, the water heater controller may be configured to initiate a flushing of the water heater according to a request and/or a schedule, as described herein. The monitoring computing device may be a mobile computing device, a laptop, a desktop, or another type of computing device. The monitoring computing device may be associated with an owner or maintainer of a structure housing the smart water heater (a "housing structure," e.g., a building or home). The monitoring computing device may be in communication with the water heater controller and/or the third party device.

The third party computing device may be any computing device associated with a third party, such as an insurance provider, a maintenance service, and/or another third party. The third party computing device may be in communication with the water heater controller and/or the monitoring computing device. The third party computing device may receive messages from the water heater controller and/or the monitoring computing device regarding the status of the smart water heater, flushing history of the smart water heater, and/or the next scheduled flushing of the smart water heater. The third party computing device may use received control signals to update an insurance policy, and/or calculate an insurance adjustment (e.g., an adjusted insurance premium). The third party computing device may then communicate these insurance adjustments to the monitoring computing device. A user of the water heater maintenance system may refer to a user of one of the monitoring computing device, the third party device, and/or of the water heater controller.

The automatic flushing water heater maintenance system may be configured to monitor and maintain the smart water heater. The inlet may provide room temperature water, sometimes referred to as cold water, to the tank. The water may be heated in the tank by the heating element then distributed throughout the housing structure. The tank of the smart water heater may store the heated water. Once the water is heated, the water may leave the tank through the outlet. The outlet water may be referred to as hot water. The flush outlet, often placed near the bottom of the tank, may be used for maintaining the smart water heater. More particularly, the flush outlet may be configured to remain closed when the smart water heater is in use and be opened (e.g., by the first control valve) when sediment is being flushed from the smart water heater. The first control valve may be coupled to the flush outlet. The first control valve may be configured to open and close the flush outlet based on commands from the water heater controller, as described further herein. The heating element may heat the water inside the tank.

The water heater controller may be configured to monitor the smart water heater and control various components associated with the smart water heater, such as the first control valve. For example, when the automatic flushing water heater maintenance system determines that the smart water heater is to be flushed, the water heater controller may send a control signal to the first control valve, which receives the signal and opens to allow for the flushing through the flush outlet. The inlet and/or the outlet may also have control valves attached thereto. For example, the inlet may have a second control valve attached thereto, and the outlet may have a third control valve attached thereto. The water heater controller may also be configured to transmit control signal to the second and/or third control valve(s) as part of the flushing process.

At least one of the technical problem addressed by this system may include: (i) an inability to detect water heater failures before damage is inflicted on the water heater tank from sediment build up; (ii) a difficulty in detecting water heater failures from sediment build up within the water heater due to inaccessibility to visually inspect the inside of the water heater tank; (iii) a difficulty with regular inspection of the water heater tank due to cost; (iv) a difficulty with regular inspection of the water heater tank due to an owner or maintainer of the structure housing the water heater forgetting to schedule inspections; and/or (iv) a difficulty in detecting a leak in a timely manner once the leak has occurred.

A technical effect of the systems and processes described herein may be achieved by performing at least one of the following steps: (a) determining that an automatic flushing process is to occur; (b) initiating the automatic flushing process; (c) transmitting a first control signal to a first control valve, the first control signal configured to cause the first control valve to open as part of the automatic flushing process to allow the flow of water and sediment through a flush outlet out of a water heater; (d) determining that the automatic flushing process is complete; and (e) transmitting a second control signal to the first control valve, the second control signal configured to cause the first control valve to close. The technical effect of the systems and processes described herein may additionally or alternatively be achieved by: (f) monitoring the smart water heater for sediment buildup using at least one detection sensor on or around the smart water heater tank; (g) sending notifications from the water heater controller to the user of the automatic flushing water heater maintenance system when the detection sensors detect sediment buildup has reached a level where sediment should be flushed from the tank; (h) receiving requests at the water heater controller from the user of the automatic flushing water heater maintenance system for an automated flush of the water heater tank; and/or (i) flushing the water heater tank automatically at the request of the detection sensors or the user of the water heater maintenance system.

The technical effect achieved by this system may be at least one of: (i) maintaining the water heater tank allowing the smart water heater to work properly for an extended amount of time; (ii) preventing progression in breaks, leaks and/or flooding in the water heater tank by early detection thereof using one or more detection sensors; and (iii) recommending a durable water heater to an owner of a commercial or residential building.

Some of the technology used by the automatic flushing water heater maintenance system is described herein. The descriptions are intended to assist in improving the understanding of the following description of the water heater maintenance system. The descriptions are not intended to be fully descriptive or limiting in any manner.

The flush outlet may be in flow communication with the water heater tank and may allow water to flow from the water heater tank to a drain or drainage area. The flush outlet may be located at the bottom of the water heater tank, facilitating the removal of the water and sediment collected near the bottom of the water heater tank when the flush outlet is opened. Maintaining the flush outlet in a closed position may keep the contents of the water heater tank within the water heater tank. Transitioning the flush outlet into an open position may allow the contents of the water heater tank to exit the tank.

As described herein, the automatic flushing water heater maintenance system may include a first control valve mounted to the flush outlet. For example, the control valve may respond to control signals to open and close the flush outlet. In addition, the system may also include similar control valves mounted to the inlet and/or the outlet of the smart water heater. For example, the inlet may have a second control valve in flow communication therewith and/or the outlet may have a third control valve in flow communication therewith. The second control valve may respond to control signals to open and close the inlet, and/or the third control value may respond to control signals to open and close the outlet.

These control valves may be solenoid valves including two-port or three-port valves, or other types of electronically controlled valves. Other types of valves may be used, such as those that may be normally closed, and that open when energized, or vice-versa.

A flushing of the water heater tank may occur when the flush outlet valve is opened, allowing the water and sediment to flow from the water heater tank. Accordingly, the water heater may be located near a drain the basement to allow the water leaving the water heater tank to flow from the water heater tank to the drain and outside of the home. When the water begins to flow from the water heater tank, the sediment buildup may also be discharged from the water heater tank, causing the water to appear a brownish color. The flow of water may continue until the water runs clear, indicating that the sediment has been removed from the water heater tank, and/or after a predetermined period of time. The flush outlet may then be placed in the closed position.

Exemplary Water Heater Maintenance System

FIG. 1 is a schematic diagram illustrating an exemplary automatic flushing water heater maintenance system 100 including a smart water heater 102, at least one detection sensor 104, a water heater controller 110, a monitoring computing device 106, and a third party computing device 108. The water heater controller 110, the monitoring computing device 106, and the third party computing device 108 may be in communication with one another. In one embodiment, the water heater controller 110, the monitoring computing device 106, and the third party computing device 108 may be in wireless communication. In another embodiment, these devices 106, 108, 110 may communicate via a wired connection. Each of these devices (the water heater controller 110, the monitoring computing device 106, and/or the third party computing device 108) may include a processor and memory. More specifically, the monitoring computing device 106 may include a processor 112 and a memory 114, the third party computing device 108 may include a processor 116 and a memory 118, and the water heater controller 110 may include a processor 120 and a memory 122. Each of the devices 106, 108, 110 may include a transceiver and/or other electronic components, including those discussed elsewhere herein.

The smart water heater 102 may be configured to maintain a constant source of heated water for the structure housing the smart water heater 102 ("housing structure," not shown). At least one detection sensor 104 may be placed on and/or around the smart water heater 102 to detect changes in moisture, pressure, temperature, corrosion, weight, and/or sound. When at least one detection sensor 104 detects a change that may indicate a problem with the smart water heater 102, such as a leak, increased electrical usage for heating the water, pressure changes in the tank, temperature changes of the tank, sediment buildup in the tank, and/or other changes that may exceed a predetermined threshold, the detection sensor 104 may transmit a signal including a message identifying the problem to the water heater controller 110. The water heater controller 110 may automatically initiate flushing of smart water heater 102 and/or may send a signal including the identified problem and requesting instructions to the monitoring computing device 106 and/or the third party computing device 108. The monitoring computing device 106 and/or the third party computing device 108 may send a response to the water heater controller 110 indicating the next course of action (e.g., instructing the water heater controller 110 to initiate flushing of the smart water heater 102, requesting a new reading from the detection sensor 104, etc.).

In some embodiments at least one detection sensor 104 may take readings on a regular basis (e.g., once a week, once a day, once an hour), or may be configured to sense a change in one or more of the variables being monitored. Data collected by the detection sensor(s) 104 may be sent to the water heater controller 110, the monitoring computing device 106, and/or the third party computing device 108. The respective one(s) of processors 112, 116, and/or 120 may parse the data received from the detection sensor 104. The parsed results may be stored in the respective one(s) of memories 114, 118, and/or 122. The automatic flushing water heater maintenance system 100 may monitor one smart water heater 102 or a plurality of smart water heaters 102.

When monitoring one smart water heater 102, data from detection sensor(s) 104 may be parsed (e.g., by one or more of processors 112, 116, and/or 120) to determine a next water heater tank flushing time and/or date, the remaining life of the smart water heater, and/or if a programmed or scheduled flushing is necessary. When monitoring a plurality of water heaters 102, data from detection sensor(s) 104 may be parsed (e.g., by one or more of processors 112, 116, and/or 120) to determine which water heater(s) 102 of the plurality of smart water heaters 102 has the greatest longevity without flushing, which water heater(s) 102 has the greatest longevity with flushing, which water heater(s) 102 accrues the least amount of sediment, and/or which water heater(s) 102 makes the most economical sense to purchase (e.g., when replacing an older water heater or buying a water heater for the first time).

In some embodiments, flushing of the smart water heater 102 may be requested by the monitoring computing device 106 and/or the third party computing device 108. For example, the monitoring computing device 106 and/or the third party computing device 108 may transmit a flushing signal to the water heater controller 110 to initiate flushing of the smart water heater 102. These requested flushings of the smart water heater 102 may occur once or multiple times. For example, a structure owner may know a first particular date that is appropriate for water heater 102 to be flushed but does not want to request or schedule any other future flushing because he does not yet know another appropriate date to have the smart water heater 102.

As another example, a building owner may receive a discount on an insurance premium for an insurance policy associated with the housing structure if he flushes the smart water heater 102 every three months. Rather than attempting to remember every three months to flush the smart water heater 102, the building owner may set the smart water heater 102 to automatically flush every three months (e.g., using the water heat controller 110 and/or the monitoring computing device 106).

In some embodiments, the third party computing device 108 and/or the monitoring computing device 106 may monitor a flushing schedule or flushing history associated with the smart water heater 102. Upon determining that the smart water heater 102 has not been flushed within a predetermined interval or by a predetermined date, the respective one or the third part computing device 108 and/or the monitoring computing device 106 may send a signal to the water heater controller 110 to initiate flushing of the smart water heater 102. The signal may include a notification or instruction(s) that the water heater 102 should be flushed. In other embodiments, the third party computing device 110 may transmit the signal to the monitoring computing device 106, and the monitoring computing device 106 may then send control signals to the water heater controller 110 requesting a flushing of the smart water heater 102.

If a problem with water heater 102 is detected by one or more of the at least one detection sensor 104, the water heater controller 110, the monitoring computing device 106, and/or the third party computing device 108, the smart water heater 103 may initiate flushing. Additionally or alternatively, if the smart water heater 102 is due for a scheduled flushing, the water heater controller 102 may initiate flushing. When the water heater controller 110 has determined that the flushing is complete, the water heater controller 110 may send a message to the monitoring computing device 106 and/or the third party computing device 108 indicating that the flushing is complete. The message, in some embodiments, may further indicate whether ant detection sensor(s) 104 detect(s) any additional or outstanding problems with the water heater 102.

Exemplary Smart Water Heater

Figure 2:
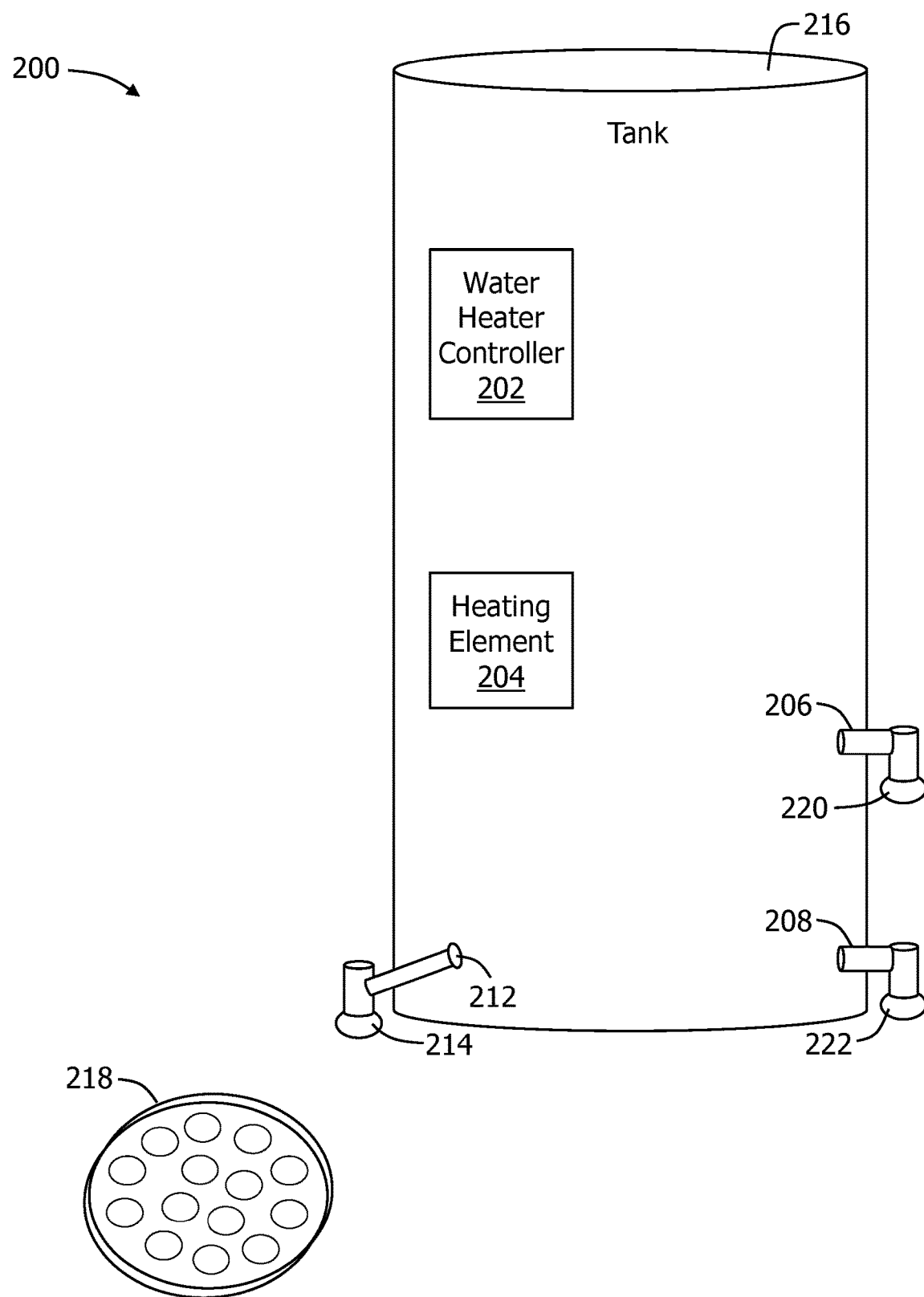
FIG. 2 is a schematic diagram illustrating an exemplary smart water heater included within the automatic flushing water heater maintenance system shown in FIG. 1.

FIG. 2 is a schematic diagram depicting an exemplary smart water heater 200, which may be similar to the smart water heater 102 shown in FIG. 1. Smart water heater 200 may include a water heater controller 202 (which may be similar to the water heater controller 110 shown in FIG. 1), a heating element 204, an inlet (e.g., for cold water) 206, an outlet (e.g., for hot water) 208, a flush outlet 212, a first control valve 214, a tank 216, a second control valve 220, and a third control valve 222. In the exemplary embodiment, a drain 218 may be located proximate to the smart water heater 200. The water heater controller 202 may be configured to monitor and controls components of the smart water heater 200, as described herein. The inlet may 206 allow room temperature (cold) water to flow therethrough into the water heater tank 216. The heating element 204 may be configured to heat the water within the water heater tank 216 to a designated or predetermined temperature. The heating element 204 may be a coil, wire, and/or other material that may conduct heat. In the exemplary embodiment, when the heating element 204 is on, it may be conducting heat. The heating element 204 may transfer heat to water inside the water heater tank 216, causing the water to be heated.

The outlet 208 may allow heated (hot) water to flow therethrough out of the water heater tank 216 and into a housing structure (e.g., building or house, not shown). After the water in the water heater tank 216 is heated in the water heater tank 216, the water may flow through the outlet 208 and to the housing structure when heated water is desired. The flush outlet 212 may allow the water heater tank 216 to be flushed.

In the exemplary embodiment, the first control valve 214 may be located proximate to, coupled to, and/or in flow communication with the flush outlet 212, the second control valve 220 may be located proximate to, coupled to, and/or in flow communication the inlet 106, and the third control valve 222 may be located proximate to, coupled to, and/or in flow communication the outlet 208. As described further herein, the first control valve 214 may be configured to receive one or more signals from the water heater controller 202 including instructions to open or close the flush outlet 212. The second control valve 220 may be configured to receive one or more signals from the water heater controller 202 including instructions to open or close the inlet 106. The third control valve 222 may be configured to receive one or more signals form the water heater controller 202 including instructions to open or close the outlet 108.

When the first control valve 214 receives instructions to be in a closed position, the flush outlet 212 may be closed, and water and/or sediment may not be flushed from tank 216. When the first control valve 214 receives instructions to transition to an open position (e.g., when a flushing process is initiated), the flush outlet 212 may be opened, and water and/or sediment may be flushed from tank 216. When the second control valve 220 receives instructions to be in an open position, the inlet 106 may be open, and (cold) water may flow into tank 216. When the second control valve 220 receives instructions to transition to a closed position (e.g., when a flushing process is initiated), the inlet 206 may be closed, and (cold) water may not flow into tank 216. When the third control valve 222 receives instructions to be in an open position, the outlet 208 may be open, and (hot) water may flow out of tank 216 to the housing structure. When the third control valve 222 receives instructions to be in a closed position (e.g., when a flushing process is initiated), the outlet 208 may be closed, and (hot) water may not flow out of tank 216.

When the flush outlet 212 (e.g., the first control valve 214 thereof) is in the open position, water flows out of the water heater tank 216 and typically to the drain 218 or drainage area. The drain 218 may catch the water that flows from the water heater tank 216. The drain 218 may run from inside the housing structure to a location outside the housing structure.

In some embodiments, during a flush of the water heater tank 216, the flush outlet 212 (e.g., the first control valve 214 thereof) may not be transitioned into the open position until the heating element 204 is powered off and/or the inlet 206 is transitioned into the closed position. The heating element 204 may be shut off because leaving the heating element 204 on while there is no water to heat in the tank 216 may damage the heating element 204. The inlet 206 may be transitioned into the closed position to prevent water from entering the tank 216 that may subsequently leave the tank 216, which may lead to flooding of the housing structure. Additionally or alternatively, the flush outlet 212 may not be transitioned into the open position until the outlet is transitioned in the closed position.

In these embodiments, the water heater controller 202 may first transmit control signal(s) to the second control valve 220 of the inlet 106 including instructions to transition into the closed position, to the heating element 204 including instructions to power off, and/or to the third control valve 220 of the outlet 108 including instructions to transition into the closed position. The water heater controller 202 may receive response signal(s) from one or more of the second control valve 220, third control valve 222, and/or heating element 204 indicating that the instructions included in the control signal(s) have been completed. The water heater controller 202 may then transmits control signal(s) to the first control valve 214 to transition the flush outlet 212 into the open position, allowing water to flow from the water heater tank 216 to the drain 218. In some embodiments, where there is no drain 218 near the smart water heater 200, a hose (not shown) may be attached to the flush valve 212 and emptied into a bucket or outside the housing structure. Alternatively, a bucket may be placed underneath the flush valve 212 and emptied outside the housing structure. Water leaving the water heater tank 216 may appear a brownish color when the flushing process begins, as the water includes sediment that has built up in the water heater tank 216. When the water leaving the water heater tank 216 appears clear, the sediment build up may have been removed from the water heater tank 216.

In some embodiments, the water heater controller 202 may be configured to determine that the flushing of the smart water heater 200 is complete when a predetermined amount of time has elapsed. The predetermined amount of time may be determined by a manufacturer of the smart water heater 200 and/or may be determined by the water heater controller 202. The predetermined amount of time may be designated as an amount of time necessary to drain the sediment from the smart water heater 200 but not so long as to flood an area surrounding the smart water heater 200. In other embodiment, the water heater controller 202 may receive signal(s) from one or more detection sensor(s) 104 located inside and/or proximate to the smart water heater 200 indicating that sediment has been removed and/or that the tank 216 is approximately empty.

When the water heater controller 202 determines that flushing of the water heater tank 216 is completed, the water heater controller 202 may transmit one or more control signals to components of the smart water heater 200. The water heater controller 202 may transmit a control signal to the first control valve 214 of the flush outlet 212 including instructions to transition into the closed position. This may prevent water from flowing out of the water heater tank 216. The water heater controller 202 may receive a response signal from the first control valve 214 indicating that the instructions have been completed. The water heater controller 202 may then transmit one or more control signals to the second control valve 220 of the inlet 106 including instructions to transition into the open position, the third control valve 222 of the outlet 108 including instructions to transition into the closed position, and/or the heating element 104 including instructions to power on.

In the exemplary embodiment, as described herein, the water heater controller 202 may be configured to transmit control signals to components of the smart water heater 200, including the heating element 204 and/or one or more of the first control valve 214, the second control valve 220, and/or the third control valve 222. For example, the water heater controller 202 may transmit control signals to heating element 204 including instructions to power on or power off. Further, the water heater controller 202 may transmit control signals including instructions for one or more of the first control valve 214, the second control valve 220, and/or the third control valve to open or close.

In the exemplary embodiment, automatic flushing of the smart water heater 200 may be initiated by the water heater controller 202. For example, the water heater controller 202 may transmit one or more of the control signals described herein to one or more components of the smart water heater 200. The water heater controller 202 may independently initiate flushing of the smart water heater 200 (e.g., without receiving instructions from any other device). Additionally or alternatively, the water heater controller 202 may receive control signals from one or more of the monitoring computing device 106 and/or the third part computing device 108 (both shown in FIG. 1) including instructions to initiate flushing of the smart water heater 200.

Flushings may be "pre-programmed" and/or requested "on demand". A scheduled, or "pre-programmed," flushing occurs when the smart water heater 200 is set to flush a regular basis. The water heater controller 202 may be configured to store one or more schedules or sets of instructions in the memory 122 (shown in FIG. 1), wherein each stored schedule or set of instructions includes instructions to initiate flushing on a particular date, at a particular time, and/or at particular interval(s). These schedules(s) and/or set(s) of instructions may be stored in the memory 122 in advance of the flushing date(s) and/or time(s). For example, the water heater controller 202 may store instructions to initiate a scheduled flushing every three months. As another example, the water heater control 202 may store instructions to initiate a single flushing on a particular date and/or at a particular time. When a pre-programmed automatic flushing of water heater maintenance system 100 is initiated, the water heater controller 202 transmits one or more control signals to initiated and/or control the flushing process.

A requested, or "on demand," flushing occurs when a particular request is made to initiate the flushing process immediately. A flushing may be requested, for example, when a user, a detection sensor 104 (shown in FIG. 1), the water heater controller 202, the monitoring computing device 106, and/or the third party computing device 108 determines that it is appropriate and/or necessary to flush the smart water heater 200. For example, the user, the detection sensor 104, the water heater controller 202, the monitoring computing device 106, and/or the third party computing device 108 may determine that the smart water heater 200 is in poor condition and/or is damaged and should be flushed immediately to prevent further damage. The user, the detection sensor, the monitoring computing device 106, and/or the third party computing device may transmit a signal to water heater controller 202 including instructions to initiate the flushing immediately. When an on-demand automatic flushing of water heater maintenance system 100 is initiated, the water heater controller 202 may transmit one or more control signals to initiate and/or control the flushing process.

When the flushing process is initiated by user 220 request, the user 220 may send a message to the water heater controller 202 requesting a flushing of the water heater 200, such as via their mobile device. The water heater controller 202 may then take the same steps it would take if it had initiated to process itself. Once the flushing process is complete, the water heater controller 202 may then send a message to the mobile device of user 220, such as via wireless communication and data transmission, informing the user 220 that the flushing of the water heater 200 had been completed.

Exemplary Water Heater Maintenance System
Including Detection Sensors

Figure 3:
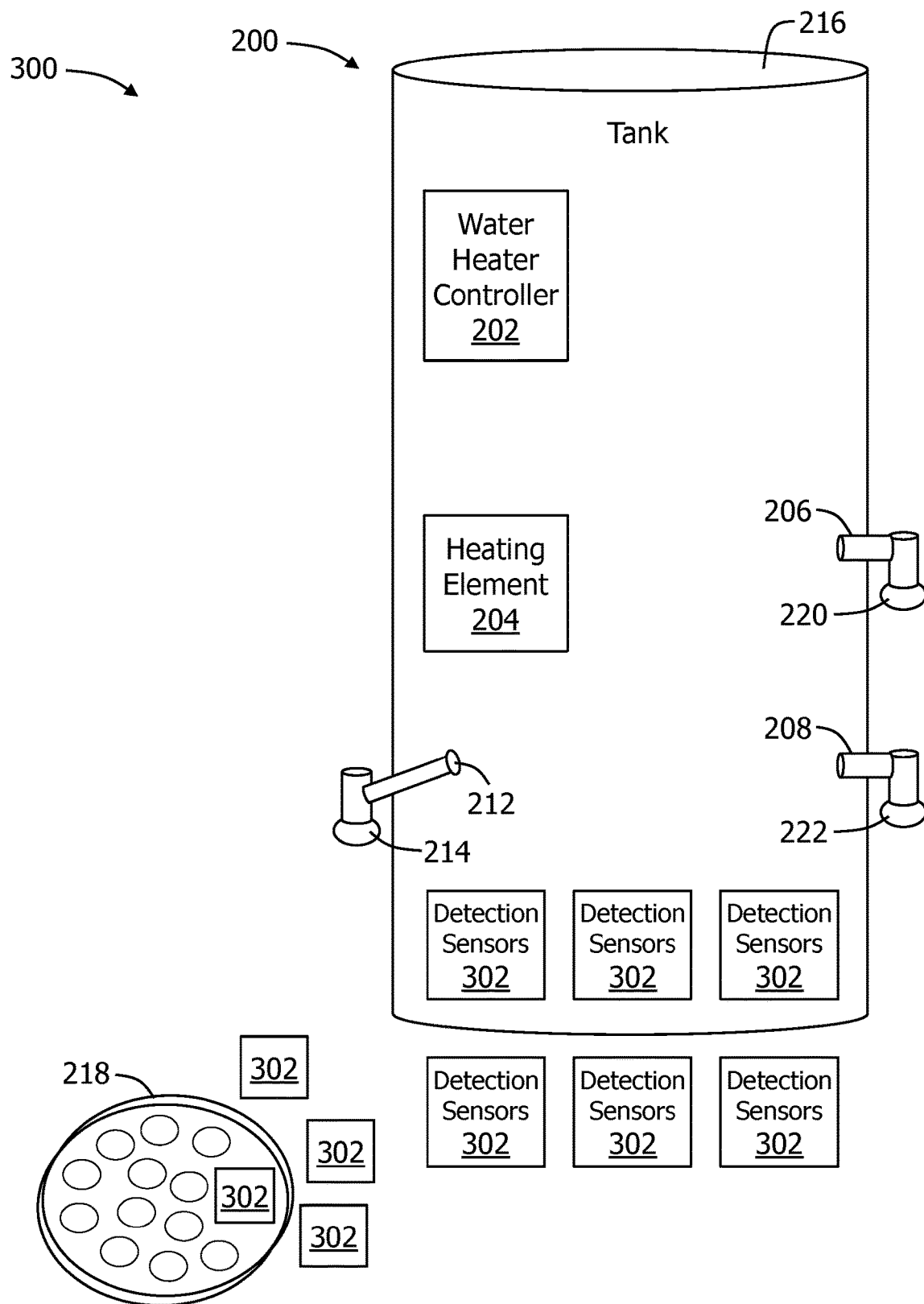
FIG. 3 is a schematic diagram illustrating the exemplary automatic flushing water heater maintenance system shown in FIG. 1 including the smart water heater shown in FIG. 2 and detection sensors.

FIG. 3 is a schematic diagram showing an exemplary automatic flushing water heater maintenance system 300, including the smart water heater 200 (shown in FIG. 2), at least one detection sensor 302, the inlet 206, the outlet 206, the first control valve 214, the tank 216, the drain 218, the second control valve 220, and the third control valve (all shown in FIG. 2). The detection sensor(s) 302 may be configured to detect a variety of changes within the smart water heater 200. Detecting these changes may include using detection techniques for variables, such as moisture, temperature, pressure, corrosion, weight, and sound. The detection sensor(s) 302 may be configured to detect changes in the smart water heater 200 by taking readings and comparing readings to each other (e.g., comparing a current reading to one or more previous readings and identifying a difference in the readings).

The detection sensor(s) 302 may include a single type of detection technique and/or a variety of detection techniques for one or more variables. For example, one detection sensor 302 may be configured to implement detection technique(s) to sense changes in a weight of the smart water heater 200. Sediment may have a different weight than water, and therefore a change in weight of the smart water heater 200 may indicate sediment buildup which may lead to breakage and/or leaks. The detection sensor(s) 302 may be located on and/or near the water heater tank 216 and/or on and/or near the drain 218.

In some embodiments, the detection sensor(s) 302 may be programmed to detect when a reading exceeds a threshold. The threshold may be a discrete value and/or may be any threshold amount of change in a sensed variable. For example, the manufacturer of the smart water heater 200 may recommend that a temperature of the water heater tank be 120 degrees Fahrenheit and that variation within 10 degrees Fahrenheit of 120 degrees Fahrenheit is acceptable. The threshold may then be a variation of greater than or equal to about 10 degrees Fahrenheit. In these embodiments, when the detection sensor(s) 302 determines the temperature exceeds the threshold, the detection sensor(s) 302 may transmit one or more control signals to the water heater controller 202 including a request for the water heater controller 202 to initiate a flushing. The water heater controller 202 may initiate the flushing or may request approval from a user associated with the smart water heater 200. If user approval is required, the water heater controller 202 may wait to initiate flushing until approval is given from the user (e.g., from the monitoring computing device 106 and/or the third party computing device 108, both shown in FIG. 1). Otherwise, the water heater controller 202 may initiate the flushing process immediately after the request is received from the detection sensor(s) 302.

Once the flushing process is complete, the water heater controller 202 may send one or more signals to the detection sensor(s) 302 indicating that the flushing is completed. Upon receipt of these signal(s) from the water heater controller 202, the detection sensor(s) 302 may be configured to take readings of the smart water heater 200 to determine if the smart water heater 200 is in satisfactory condition. "Satisfactory condition" may include that the readings are within the recommended threshold. The detection sensor(s) 302 may then send response signal(s) to the water heater controller 202 indicating the status of the smart water heater 200 (e.g., satisfactory or unsatisfactory). The water heater controller 202 may then send a message to the user (e.g., to the monitoring computing device 106 and/or the third party computing device 108) indicating that the flushing had a satisfactory or unsatisfactory result.

In other embodiments, the detection sensor(s) 302 may be programmed to send routine updates to the water heater controller 202, the monitoring computing device 106, and/or the third party computing device 108. These updates may include data about a current state of the smart water heater 200. If one or more of the water heater controller 202, the monitoring computing device 106, and/or the third party computing device 108 (and/or a user thereof) detects a possible problem, the respective detecting party and/or device may request a flushing by sending a message to water heater controller 202. Additionally or alternatively, if the water heater controller 202 determines that there may be a potential problem with the smart water heater 200, the water heater controller 202 may transmit a message to the monitoring computing device and/or the third party computing device 108 identifying and/or explaining the potential problem. The message may further request permission to initiate a flushing of the water heater tank 216. If the monitoring computing device 106, and/or the third party computing device 108 (and/or a user thereof) transmits a signal including the requested permission, the water heater controller 202 may initiate the flushing process. Once the flushing process is complete, the detection sensor(s) 302 may ensure that a current reading is within the threshold, then send a message to the water heater controller 202, the monitoring computing device 106, and/or the third party computing device 108 (and/or a user thereof) that the condition of the smart water heater 200 is satisfactory.

In some embodiments, the water heater controller 202 may initiate the flushing process without permission from the user 304. Once the flushing process is complete, the detection sensor(s) 302 may take a reading to determine if the smart water heater 200 is in satisfactory condition. A message may then be sent from the water heater controller 202 the monitoring computing device 106 and/or the third party computing device 108 (and/or a user thereof) indicating that the condition of the smart water heater 200 is satisfactory.

Exemplary Water Heater Maintenance System User Interface

Figure 4:
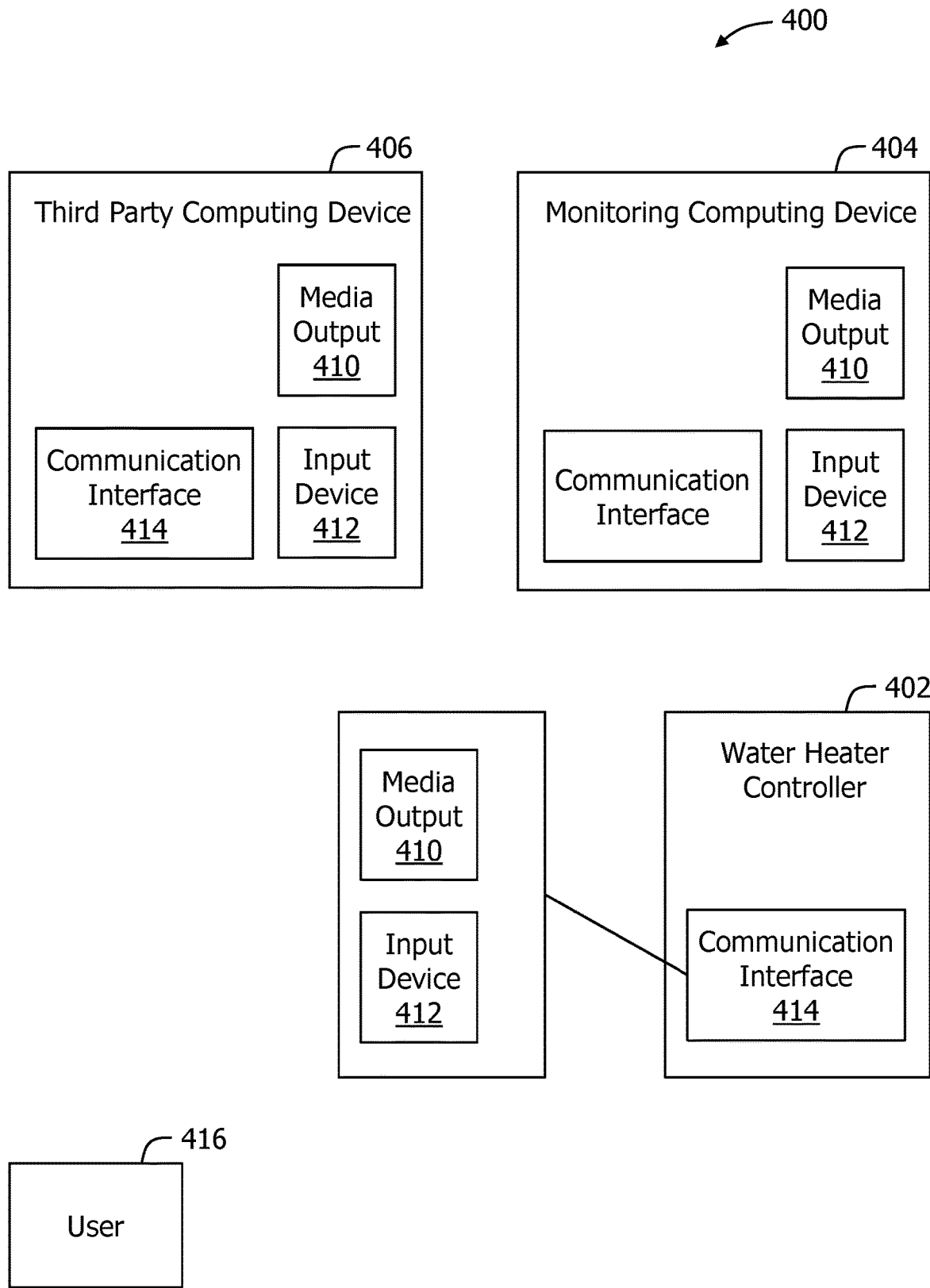
FIG. 4 is a schematic diagram showing an exemplary automatic flushing water heater maintenance computer system that may be accessed by the smart water heater shown in FIG. 2.

FIG. 4 is a schematic diagram showing an exemplary automatic flushing water heater maintenance computer system 400 that may be accessed by the smart water heater 102 shown in FIG. 1. The water heater maintenance system computer system 400 may include a water heater controller 402 (which may be similar to the water heater controller 110 shown in FIG. 1, and/or the water heater controller 202 shown in FIGS. 2 and 3), a monitoring computing device 404 (which may be similar to the monitoring computing device 106 shown in FIG. 1), and a third party computing device 406 (which may be similar to the third part computing device 108 shown in FIG. 1). The water heater controller 402 may be in communication with smart water heater 102 and/or the water heater tank 216 (shown in FIGS. 2 and 3). The water heater controller 402 may be physically or directly accessed by a user 416 associated with the water heater controller 402. The water heater controller 402 may also be remotely accessed by those that have wireless access to the water heater controller 402 (e.g., over the Internet).

The monitoring computing device 404 may be in communication with the water heater controller 402, and may include a computing device that is owned or operated by an owner/maintainer of a structure ("housing structure," e.g., a building or house) housing the smart water heater 200 (shown in FIGS. 2 and 3). The monitoring computing device 404 may be utilized by the user 416 to access and/or communicate with the water heater controller 402. The third party computing device 406 may be in communication with the water heater controller 402 and may include a computing device that is operated by a third party, such as an insurance provider. The third party computing device 406 may be utilized by user 416 (e.g., an employee of an insurance company) may be in communication with the water heater controller 402. The water heater controller 402 and/or the monitoring computing device 404 may be configured to transmit signal(s) to the third party computing device 406 before, during, and/or after a flushing process. The signal may be configured to activate the third party computing device 40 and cause the third party computing device 406 to automatically update and/or generate one or more insurance forms that are pre-populated with information associated with the smart water heater 200, the housing structure, and/or an insurance policy associated with the housing structure.

Each of the water heater controller 402, the monitoring computing device 404, and the third party computing device 406 may receive data from one or more detection sensor(s) 302 (shown in FIG. 3). In some embodiments, the water heater controller 402, the monitoring computing device 404, and/or the third party computing device 406 may parse the data received from the detection sensor 302 to determine if there is any indication of failure in the smart water heater 200. The user 416 of one of these devices (the water heater controller 402, the monitoring computing device 404, and/or the third party computing device 406) may review the parsed data to detect a problem with the smart water heater 200.

User interaction with one of the water heater controller 402, the monitoring computing device 404, and/or the third party computing device 406 may be facilitated through a media output 410, an input device 412, and/or a communication interface 414. The media output 410 may be configured to present information to user 416. Media output 410 may be any component capable of conveying information to user 416. In some embodiments, media output 410 may include an output adapter, such as a video adapter and/or audio adapter. An output adapter may be operatively coupled to an output device, such as a display device, a liquid crystal display (LCD), organic light emitting diode (OLED) display, or "electronic ink" display, or an audio output device, a speaker or headphones.

In some embodiments, the water heater controller 402, the monitoring computing device 404, and/or the third party computing device 406 may include the input device 412. Input device 412 may include, for example, a keyboard, a point device, a mouse, a stylus, a touch sensitive panel, a touch pad, a touch screen, a gyroscope, an accelerometer, a position detector, and/or an audio input device. A single component, such as a touch screen, may function as both an output device of media output 410 and input device 412.

The water heater controller 402, the monitoring computing device 404, and/or the third party computing device 406 may also include the communication interface 414, which may be communicatively coupled to a remote device such as ant other of the water heater controller 402, the monitoring computing device 404, and/or the third party computing device 406. Communication interface 414 may include, for example, a wired or wireless network adapter or a wireless data transceiver for use with a mobile phone network, Global System for Mobile communications (GSM), 3GG, or other mobile data network or Worldwide Interoperability for Microwave Access (WIMAX).

Exemplary Method of Flushing a Water Heater

Figure 5:
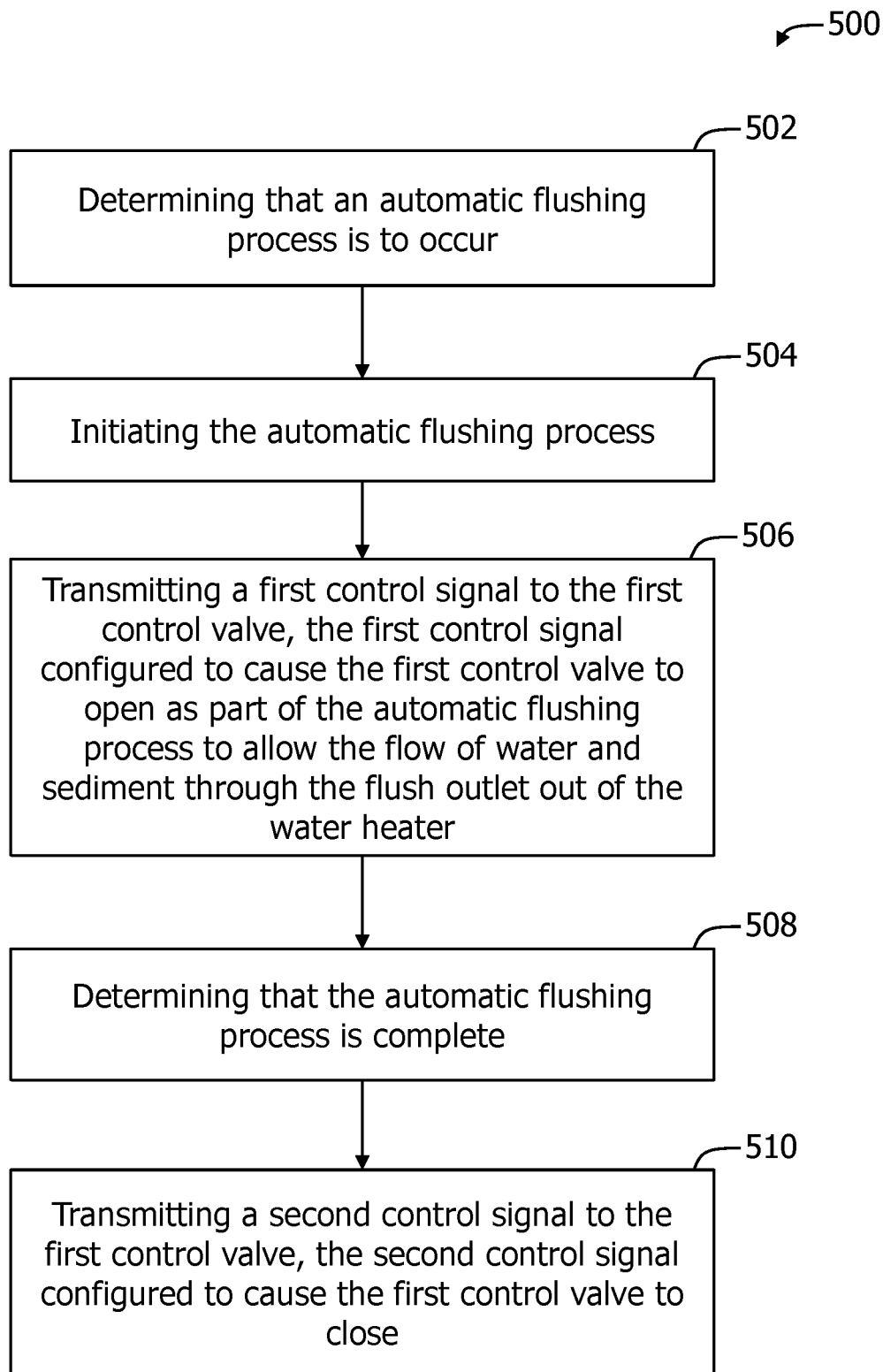
FIG. 5 is a flow diagram illustrating an exemplary method for automatically flushing a water heater using the automatic flushing water heater maintenance system shown in FIG. 1.

FIG. 5 is a flow diagram of an exemplary method 500 for automatically flushing a water heater. In the exemplary embodiment, the method 500 may be implemented using a water heater controller (e.g., water heater controller 110, shown in FIG. 1, water heater controller 202, shown in FIGS. 2 and 3, and/or water heater controller 402, shown in FIG. 4). In one embodiment, the water heater (e.g., water heater 102, shown in FIG. 1, and/or water heater 200, shown in FIGS. 2 and 3) may include an inlet (e.g., inlet 206, shown in FIGS. 2 and 3), an outlet (e.g., outlet 208, shown in FIGS. 2 and 3), and a flush outlet (e.g., flush outlet 212, shown in FIGS. 2 and 3). The flush outlet may have a first control valve (e.g., first control valve 214, also shown in FIGS. 2 and 3) in flow communication therewith. The first control valve may be configured to control a flow of water and sediment through the flush outlet out of the water heater.

The method 500 may include determining 502 that an automatic flushing process is to occur and initiating 504 the automatic flushing process. The method 500 may also include transmitting 506 a first control signal to the first control valve, the first control signal configured to cause the first control valve to open as part of the automatic flushing process to allow the flow of water and sediment through the flush outlet out of the water heater. The method 500 may further include determining 508 that the automatic flushing process is complete, and transmitting 510 a second control signal to the first control valve, the second control signal configured to cause the first control valve to close.

It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Memory may include, but is not limited to, random access memory (RAM), such as dynamic RAM (DRAM) or static RAM (SRAM), read-only memory (ROM), erasable programmable read-only memory (EPROM), electrically erasable programmable read-only memory (EEPROM), and/or non-volatile RAM (NVRAM). The above memory types are exemplary only, and are thus not limiting as to the types of memory usable for storage of a computer program.

In some embodiments, method 500 may include additional and/or alternative steps. For example, method 500 may include one or more of: (1) collecting, generating, or receiving, sensor data from one or more sensors disbursed about a smart water heater, the one or more sensors being embedded in water heater or surrounding area (such as in selected portions of ground or the area around the water drain); (2) determining or detecting, via the one or more processors, that an abnormal or unexpected condition exists from analysis of the sensor data, the abnormal or unexpected condition indicative that damage to the water heater is occurring or has occurred; (3) generating, via the one or more processors, a message detailing or associated with the abnormal or unexpected condition; and/or (4) transmitting using wireless communication or data transmission, the message to a mobile device of a home owner (or otherwise causing, via the one or more processors, the message to be displayed on the mobile device of the home owner) to facilitate informing the home owner (i) of the abnormal or unexpected condition within the water heater exists, (ii) that damage may have occurred to the water heater, and/or (iii) that flushing may be needed to mitigate further damage to the water heater. The method 500 may include additional, less, or alternate actions, including those discussed elsewhere herein.

For instance, the one or more sensors may be configured to measure or sense pressure, temperature, weight, corrosion, and/or sound. The message may include recommendations to the building or home owner, such as a recommended time to flush the water heater.

The method may further include (i) sending or transmitting, the sensor data to an insurance provider remote server with the home owner's permission or affirmative consent; (ii) receiving, (a) insurance-related recommendations, (b) insurance policy, premium, discount, or rate updates or changes, and/or (c) prepared or proposed insurance claims associated with the damage to the building and/or water heater from the insurance provider remote server (such as via wireless communication or data transmission); and/or (iii) causing, via the one or more processors, the (a) insurance-related recommendations, (b) insurance policy, premium, discount, or rate updates or changes (such as updates to home owners or renters insurance, coverages, limits, deductibles, etc.), and/or (c) prepared or proposed insurance claims associated with the damage to the building to be displayed on a mobile device of the building or home owner for their review, approval, and/or modification (such as by transmitting the recommendations or insurance policy information to the mobile device of the building or home owner).

The one or more detection sensors may wirelessly communicate directly or indirectly with (i) a water heater controller; (ii) a mobile device of a building or home owner (e.g., a monitoring computing device); and/or (iv) a computing device of a third party (e.g., a third party computing device).

Determining or detecting, an abnormal or unexpected condition exists from analysis of the sensor data may include (1) comparing the sensor data with data associated with expected or normal conditions and/or a baseline of historical or normal data; and/or (2) determining or estimating a severity of the abnormal condition and/or damage to the water heater and/or structure housing the water heater, such as by (i) detecting an amount of pressure, temperature, weight, corrosion, and/or sound; (ii) determining or estimating a length of time that the abnormal condition has existed; and/or (iii) determining or estimating a size of the abnormal condition and/or an area that may be impacted by the abnormal condition and/or that has incurred damage.

The method may also include adjusting, updating, or generating, via one or more processors, insurance policies based upon functionality associated with the sensor embedded in construction material and located throughout an insured home that prevents, alleviates, and/or mitigates damage to the insured home. For instance, discounts or lower premiums on home insurance to insureds that have the embedded sensor functionality that mitigates home damage may be provided and/or calculated by one or more processors.

In one embodiment, a home owner may opt-in to an insurance discount or other program, and in return for sharing data associated with, or originating from, their smart water heater and/or interconnected smart home controller, the home owner may receive insurance discounts for having smart home functionality that may be mitigate and/or prevent damage to their home and personal belongings thereof. An insurance provider remote server may receive and analyze the smart water heater (or other smart home) data, with the customer's permission or affirmative consent, to determine insurance discounts based upon the smart water heater functionality discussed herein, and/or usage-based discounts based upon an amount of use of the smart water heater functionality within an insured home.

Exemplary Insurance-Related Functionality

As noted herein, the present embodiments may relate to collecting, generating, or receiving data associated with an insurance-related event (such as damage to a property due to breaks, leaks, and/or flooding of a water heater tank). Data related to a current state of the water heater tank may be collected by detection sensors. For example, the at least one detection sensor may collect data (or reading) of the moisture, temperature, weight, pressure and sound associated with the water heater tank. The data may be sent to the insurance provider and stored locally on a memory device associated with the insurance provider.

In particular, the detection sensors may collect data at times when the water heater tank is in satisfactory condition, when the water heater tank has a break, leak or floods, and when the water heater tank is accumulating sediment buildup. Data collected may give a fuller understanding of how the smart water heater being monitored holds up over time and the helpful effects of flushing the water heater tank. Such data may be used by the insurance provider to (i) determine, catalog, characterize, or observe the quality of the smart water heater, specifically the water heater tank, (ii) prepare or populate a claim form associate with damage to the smart water heater, the water heater tank, or the structure (i.e., building or home) housing the water heater, (iii) prepare a premium for an insurance provider customer, and/or (iv) compare quality of different brands, makes, models and years of smart water heaters.

In one aspect, the insurance provider may program internal device to determine the water heater that stays in satisfactory condition for the greatest length of time or the water heater that is most likely to break even when flushed on a regular basis. These determinations may assist the insurance provider in determine the premium to assign to each water heater.

The insurance-related message may include an update to a home owners or renters insurance policy, such as a change in premium, discount, or rate based upon the sensor data received for an insurance customer's review or approval. The insurance-related message may include a proposed insurance claim for an insurance customer's review, modification, or approval based upon the sensor data received and/or an estimated amount or extent of home damage based upon computer analysis of the sensor data.

Additionally or alternatively, the method may include adjusting, updating, and/or generating, via one or more processors, insurance policies based upon functionality associated with the sensors embedded in construction material and located throughout an insured home that prevents, alleviates, and/or mitigates damage to the insured home. For instance, discounts or lower premiums on home insurance for insureds that have the embedded sensor functionality that mitigates home damage, or alleviates the frequency or severity of insurance-related events or home damage, may be calculated by one or more processors and provided to insureds.

Exemplary Smart Flush Functionality

A Smart Flush System for Water Heaters (i.e., an automatic flushing water heater maintenance system) may be provided that includes a programmable, connected, automated flushing device that helps extend the life of a water heater. The Smart Flush System may provide the following features: prevention, detection, mitigation and conservation.

With respect to prevention, the Smart Flush System may hook up to a water heater and clear out the sediment build up at the specific pre-programmed date and time. The excess water is then directed into the floor drain. The Smart Flush device may also connect to a smartphone or mobile device, which sends home owners notifications and reminders on when to flush their water heater, advises you the task has been completed, reminds you to check other systems in your home, such as the functionality of your sump pump or to change your furnace filter, or provides other home maintenance tips.

In order to create a device that will allow for programmable flushing, a smart or electronically controllable valve may be able to open and close the spigot on the water heater. A solenoid valve (i.e., a control valve) may include an electro-magnetic device consisting of wire wrapped around a core that produces a magnetic field when activated. The valve may open and/or close when activated by a system controller. The system may be able to connect to the spigot, direct the water into the floor drain, sump pit, or bucket at the specific date and time programmed. The system may reduce the amount of water claims caused by water heaters, and reduces the risk of water damage because the inevitable sediment build up inside the water heater may lead to premature and/or the eventual failure of the water heater. The process of flushing sediment build up may extend the life of your water heater, and therefore reduce the risk of failure and water damage to a home.

Regarding detection, the Smart Flush System may include a sensor (i.e., a detection sensor) that provides detection for the following potential issues: sediment build up, corrosion, an unusual increase in pressure or temperature and leaks. If any of these potential risks are detected by the Smart Flush sensor, a notification may be immediately sent to smart phone or other mobile device or wireless device.

Sensors may be installed inside the water heater (a spectrometer may be used in one embodiment—as long as it is encased in glass within the unit, it may detect corrosion and sediment build-up through the water). Additionally or alternatively, sensors may be installed outside the unit (for leak detection, pressure, temperature, etc.)

For mitigation, the Smart Flush System's detection sensor may provide an automatic shut-off for potential risks that could cause water damage to the home. For example, if a leak were to occur, the sensor may trigger the automatic shut-off for the inlet valve going into the water heater. This sensor may also be installed on other appliances such as the washing machine, dishwasher, ice maker line, etc. A solenoid device or valve may be used for the opening and closing of the water supply line valve when an issue is detected.

For conservation, the Smart Flush System may include an automatic shut-off timer in order to conserve water. The timer may provide a customer with the ability to save money (by shortening the length of time for a shower), help the environment (especially during droughts), and extend the life of the water heater by reducing use. The solenoid device or valve may be set on a timer to automatically shut the valve on the water heater to prevent further usage of water once that time has been reached. The timer functionality may be programmed on a smartphone, tablet, or other mobile device for easy access. The mobile device may also include the capability of controlling the flow of water rather than just the temperature.

Exemplary Computer-Implemented Methods

In one aspect, a computer-implemented method of flushing a water heater may be provided. The method may include (1) detecting, via one or more processors or sensors, that an abnormal condition exists within a water heater; (2) remotely opening, via the one or more processors or associated transceivers, an electronically operated outlet valve or spigot on the water heater to allow flushing of the water heater for a predetermined amount of time or until the abnormal condition clears according to the one or more sensors; (3) detecting, via the one or more processors or sensors, that the abnormal condition has cleared; and/or (4) remotely closing, via the one or more processors or associated transceivers, the electronically operated outlet valve or spigot to finish flushing the water heater to facilitate extending the useful life of the water heater. The abnormal condition may be associated with pressure buildup, sediment buildup, or abnormal temperature within the water heater and may be detected by a sensor on or within the water heater. The method may include transmitting, via one or more processors or associated transceivers (and via wireless communication or data transmission), a wireless communication message to a mobile device associated with a home owner indicating the abnormal condition exists; and/or receiving, via the one or more processors or associated transceivers, an instruction from the mobile device, via wireless communication or data transmission, to remotely flush the water heater, such as by remotely opening and then closing the electronically operated outlet valve or spigot.

In another aspect, a computer-implemented method of flushing a water heater may be provided. The method may include (1) determining, via one or more processors, that a predetermined amount of time has passed (or it is time for periodic maintenance) or an abnormal condition exists within a water heater; (2) generating, via the one or more processors, an electronic message recommending to flush a water heater; (3) transmitting, via the one or more processors or associated transceivers, the electronic message to a mobile device of a user (via wireless communication or data transmission); (4) receiving, via the one or more processors or associated transceivers, an electronic instruction from the mobile device of the user to flush the water heater (via wireless communication or data transmission); (5) remotely opening, via the one or more processors or associated transceivers, an electronically controllable outlet valve or spigot of the water heater to allow flushing of the water heater; and/or (6) remotely shutting, via the one or more processors or associated transceivers, the electronically controllable outlet valve or spigot of the water heater after a predetermined amount of time, or after the abnormal condition has cleared, to complete flushing of the water heater and facilitate extending the useful life of the water heater. The abnormal condition may be associated with pressure buildup, sediment buildup, or abnormal temperature within the water heater, and may be detected by a sensor on or within the water heater.

In another aspect, a computer-implemented method of mitigating damage caused by water heater leakage may be provided. The method may include (1) detecting or determining, via one or more processors or sensors, an abnormal flow of water into or out of a water heater (such as by measuring the flow of water and comparing to a baseline of normal flow stored in a memory); (2) generating, via the one or more processors, a wireless communication instructing an inlet valve or electronically controllable valve to close, or energizing a solenoid that closes the inlet valve; and/or (3) transmitting, via the one or more processors or associated transceiver, the wireless communication to the inlet valve or electronically controllable valve such that the valve closes, shutting off the source of water to the water heater and mitigating damage caused by leakage from the water heater.

The foregoing methods may include additional, less, or alternate functionality, including that discussed elsewhere herein. The foregoing methods may be implemented via one or more remote or local processors, transceivers, and/or sensors, and/or via computer-executable instructions stored on non-transitory computer-readable media or medium.

Exemplary Computer Systems

In one aspect, a computer system for flushing a water heater may be provided. The computer system may include one or more processors, transceivers, and/or sensors configured to: (1) detect that an abnormal condition exists within a water heater; (2) remotely open an electronically operated outlet valve or spigot on the water heater to allow flushing of the water heater for a predetermined amount of time or until the abnormal condition clears according to the one or more sensors; (3) detect that the abnormal condition has cleared; and/or (4) remotely close the electronically operated outlet valve or spigot to finish flushing the water heater to facilitate extending the useful life of the water heater. The abnormal condition may be associated with pressure buildup, sediment buildup, or abnormal temperature within the water heater, and may be detected by a sensor on or within the water heater. The system may further be configured to transmit, via wireless communication or data transmission, a wireless communication message to a mobile device associated with a home owner indicating the abnormal condition exists; and/or receive an instruction from the mobile device, via wireless communication or data transmission, to remotely flush the water heater, such as by remotely opening and then closing the electronically operated outlet valve or spigot.

In another aspect, a computer system for flushing a water heater may be provided. The computer system may include one or more processors, transceivers, and/or sensors configured to: (1) determine that a predetermined amount of time has passed (or it is time for periodic maintenance), or sense that an abnormal condition exists within a water heater; (2) generate an electronic message recommending to flush a water heater; (3) transmit the electronic message to a mobile device of a user via wireless communication or data transmission; (4) receive an electronic instruction from the mobile device of the user to flush the water heater via wireless communication or data transmission; (5) remotely open an electronically controllable outlet valve or spigot of the water heater to allow flushing of the water heater; and/or (6) remotely shut the electronically controllable outlet valve or spigot of the water heater after a predetermined amount of time to complete flushing of the water heater and facilitate extending the useful life of the water heater. The abnormal condition may be associated with pressure buildup, sediment buildup, or abnormal temperature within the water heater, and may be detected by a sensor on or within the water heater.

In another aspect, a computer system for mitigating damage caused by water heater leakage may be provided. The computer system may include one or more processors, transceivers, and/or sensors configured to: (1) detect or determine an abnormal flow of water into or out of a water heater (such as by measuring the flow of water and comparing to a baseline of normal flow stored in a memory); (2) generate a wireless communication or control signal instructing an inlet valve or electronically controllable valve to close, or energizing a solenoid that closes the inlet valve; and/or (3) transmit the control signal, via wireless communication or data transmission, the wireless communication or control signal to the inlet valve or electronically controllable valve such that the valve closes, shutting off the source of water to the water heater and mitigating damage caused by leakage from the water heater.

The foregoing computer systems may include additional, less, or alternate functionality, including that discussed elsewhere herein.

ADDITIONAL CONSIDERATIONS

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method of flushing a water heater having a flush outlet in flow communication with the water heater, the method implemented using at least one processor in communication with an electronically operated valve mounted to the flush outlet, the method comprising:
   determining that an abnormal condition exists within the water heater;
   transmitting a wireless communication message to a monitoring computing device or a third party computing device, wherein the wireless communication message indicates the abnormal condition exists;
   receiving an instruction from the monitoring computing device or the third party computing device to remotely flush the water heater by remotely opening and then closing the electronically operated valve;
   based upon the determination that the abnormal condition exists, opening the electronically operated valve;
   monitoring the water heater to detect when the abnormal condition has cleared; and
   based upon detecting that the abnormal condition has cleared, closing the electronically operated valve.

2. The computer-implemented method of claim 1, wherein the abnormal condition is associated with at least one of pressure buildup, sediment buildup, or abnormal temperature within the water heater.

3. A computer system for flushing a water heater having a flush outlet in flow communication with the water heater, the computer system comprising at least one processor in communication with an electronically operated valve mounted to the flush outlet, configured to:
   determine that an abnormal condition exists within the water heater;
   transmit a wireless communication message to a monitoring computing device or a third party computing device, wherein the wireless communication message indicates the abnormal condition exists;
   receive an instruction from the monitoring computing device or the third party computing device to remotely flush the water heater by remotely opening and then closing the electronically operated valve;
   based upon the determination that the abnormal condition exists, opening the electronically operated valve;
   monitor the water heater to detect when the abnormal condition has cleared; and
   based upon detecting that the abnormal condition has cleared, closing the electronically operated valve.

4. The computer system of claim 3, wherein the abnormal condition is associated with pressure buildup, sediment buildup, or abnormal temperature within the water heater.

5. The computer system of claim 3, wherein at least one sensor is in communication with a water heater controller and positioned at a location proximate to the water heater, the at least one sensor configured to monitor at least one variable associated with the water heater and to transmit a signal to the water heater controller, wherein the signal includes an indication of a condition of the water heater.

6. The computer system of claim 5, wherein the water heater controller is further configured to receive a sensor signal from the at least one sensor, the sensor signal including a reading of the at least one monitored variable.

7. The computer system of claim 6, wherein the water heater controller is further configured to initiate an automatic flushing process when the reading of the at least one monitored variable is outside of a predetermined threshold.

8. The computer system of claim 5, wherein the water heater controller is further configured to automatically initiate an automatic flushing process.

9. The computer system of claim 5, wherein the water heater controller is further configured to:
- transmit a request signal to the monitoring computing device or the third party computing device in communication with the water heater controller, the request signal including a request for permission to initiate an automatic flushing process; and
- receive a response signal from the monitoring computing device or the third party computing device, the response signal configured to cause the water heater controller to initiate the automatic flushing process.

10. A computer system for flushing a water heater having a flush outlet in flow communication with the water heater, the computer system comprising one or more processors in communication with an electronically operated valve mounted to the flush outlet, the one or more processors configured to:
- determine that an abnormal condition exists within the water heater;
- transmit an electronic message to a monitoring computing device or a third party computing device, wherein the message indicates the abnormal condition exists;
- receive an electronic instruction from the monitoring computing device or the third party computing device to remotely flush the water heater by remotely opening and then closing the electronically operated valve;
- based upon the received electronic instruction, open the electronically operated valve;
- monitor the water heater to detect when the abnormal condition has cleared; and
- based upon detecting that the abnormal condition has cleared, close the electronically operated valve.

11. The computer system of claim 10, wherein the abnormal condition is associated with pressure buildup, sediment buildup, or abnormal temperature within the water heater, and is detected by at least one sensor.

12. The computer system of claim 10 further comprising at least one detection sensor in communication with a water heater controller and positioned at a location proximate to the water heater, the at least one detection sensor configured to monitor at least one variable associated with the water heater and to transmit a signal to the water heater controller, wherein the signal includes an indication of a condition of the water heater.

13. The computer system of claim 12, wherein the water heater controller is further configured to receive a sensor signal from the at least detection one sensor, the sensor signal including a reading of the at least one monitored variable.

14. The computer system of claim 13, wherein the water heater controller is further configured to initiate an automatic flushing process when the reading of the at least one monitored variable is outside of a predetermined threshold.

15. The computer system of claim 12, wherein the water heater controller is further configured to automatically initiate an automatic flushing process.

16. The computer system of claim 12, wherein the water heater controller is further configured to:
- transmit a request signal to at least one of the monitoring computing device and the third party computing device in communication with the water heater controller, the request signal including a request for permission to initiate an automatic flushing process; and
- receive a response signal from at least one of the monitoring computing device and the third party computing device, the response signal configured to cause the water heater controller to initiate the automatic flushing process.

17. The computer system of claim 12, wherein the monitoring computing device is associated with a user of the water heater and is in communication with the water heater controller, wherein the water heater controller is configured to receive a control signal from the monitoring computing device, and wherein the control signal is configured to cause the water heater controller to initiate an automatic flushing process.

18. The computer system of claim 12, wherein the third party computing device is associated with an insurance provider and is in communication with the water heater controller, wherein the water heater controller is configured to receive a control signal from the third party computing device, and wherein the control signal is configured to cause the water heater controller to initiate an automatic flushing process.

\* \* \* \* \*